United States Patent [19]

Watts

[11] 3,862,349

[45] Jan. 21, 1975

[54] TELEPHONE CABLE PIPE CABLE ASSEMBLY AND METHOD

[76] Inventor: James R. Watts, Box 83, R.R. No. 3, Owensboro, Ky. 42301

[22] Filed: Nov. 2, 1973

[21] Appl. No.: 412,247

Related U.S. Application Data

[63] Continuation of Ser. No. 297,064, Oct. 12, 1972, abandoned.

[52] U.S. Cl............. 174/11 R, 61/72.1, 73/40.5 R, 174/10, 174/19, 174/24, 174/26 G, 174/38, 174/68 C, 174/77 R
[51] Int. Cl........ H02g 9/06, H02g 1/08, H01b 7/32
[58] Field of Search............. 174/8, 10, 11 R, 14 R, 174/15 C, 19, 20, 23 R, 24, 25 R, 25 G, 26 R, 26 G, 27, 37, 38, 68 R, 68 C, 75 B, 76, 77 R, 82; 29/428, 433; 61/72.1; 73/40.5 R, 40.7; 254/134.3 FT

[56] References Cited
UNITED STATES PATENTS

| | | | |
|---|---|---|---|
| 1,115,447 | 10/1914 | Liversidge | 174/76 |
| 1,928,575 | 9/1933 | Sievert et al. | 174/26 R |
| 2,004,589 | 6/1935 | Smedley | 174/68 C |
| 2,236,286 | 3/1941 | Dunsheath | 174/25 G X |
| 2,348,968 | 5/1944 | Flath | 174/75 B |
| 2,432,568 | 12/1947 | Gambitta | 174/25 G X |
| 3,084,208 | 4/1963 | Palandri et al. | 174/24 |
| 3,132,415 | 5/1964 | Johnson et al. | 174/68 C X |
| 3,361,547 | 1/1968 | Packo | 73/40.5 R X |
| 3,694,563 | 9/1972 | Monds et al. | 174/68 C X |
| 3,170,026 | 2/1965 | Woodson | 174/15 C |

Primary Examiner—Laramie E. Askin
Attorney, Agent, or Firm—Cameron, Kerkam, Sutton, Stowell & Stowell

[57] ABSTRACT

A telephone cable pipe cable especially adapted for underground installation has an outer protective sheath in the form of a flexible plastic pipe and a conventional telephone cable inside of, and fixed at its ends to, the pipe, the inside diameter of the pipe being sufficiently larger than the outside diameter of the telephone cable to permit the future placement in the pipe of at least one additional cable. A pull-in wire may be provided inside the pipe, paralleling the telephone cable, for use in pulling in an additional cable after the cable pipe cable has been placed in service. The terminal ends of each length of cable pipe cable are provided with butt sleeves containing sealer compound through which extend the capped ends of the telephone cable. The interior of the pipe may be filled with colored air or gas under pressure for indicating the location of a leak or break in the pipe by rising to the top of the ground in which the cable pipe cable is buried and coloring the surface thereof adjacent the point of damage.

4 Claims, 6 Drawing Figures

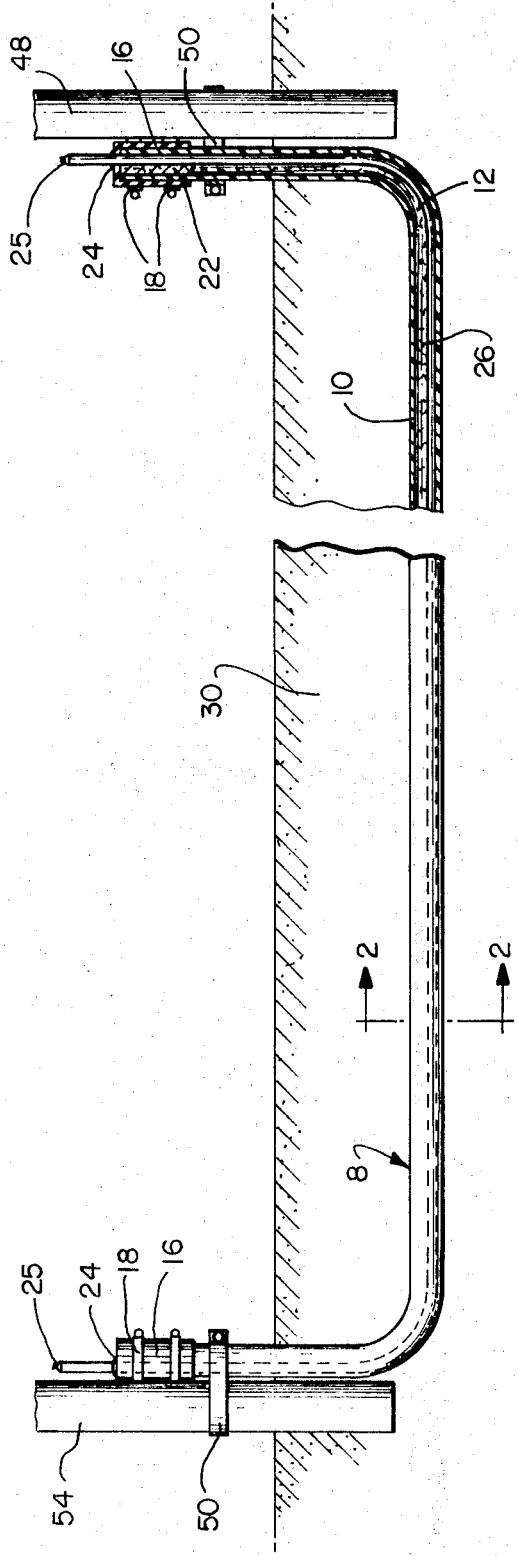
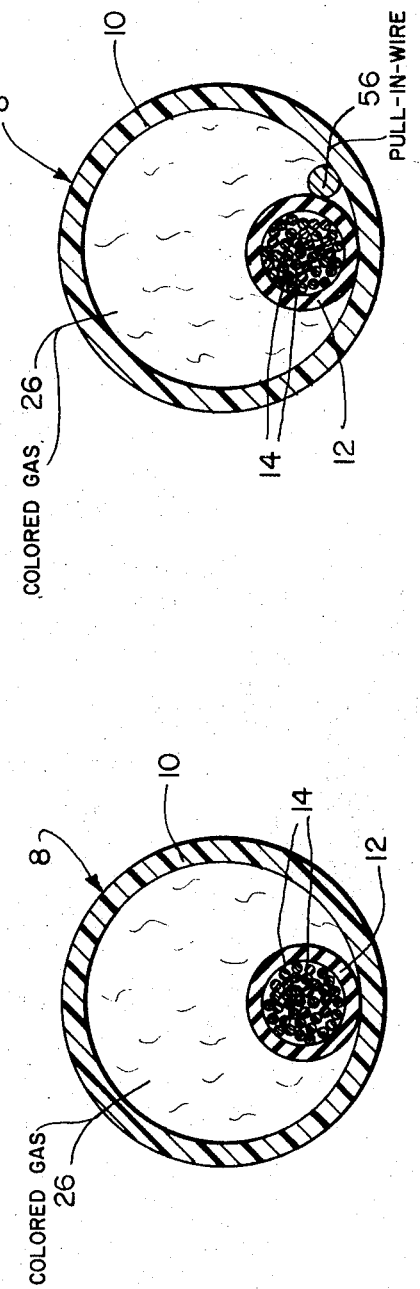
FIG. 1
FIG. 2
FIG. 3

TELEPHONE CABLE PIPE CABLE ASSEMBLY AND METHOD

This application is a continuation of application Ser. No. 297,064 filed Oct. 12, 1972, now abandoned.

This invention relates to telephone cables, and more particularly to telephone cables adapted for underground installation in localities where increased demands for service after an initial cable installation require the provision of additional cable pairs along the same route as the original cable.

The principal object of the invention is to provide an improved form of telephone cable structure, referred to hereinafter as a cable pipe cable, which can be quickly installed underground for substantially the same cost, and by use of the same type of cable plowing or trenching equipment, as a conventional telephone cable, and which enables an increase in telephone service along an existing cable route at an expense substantially less than that involved in supplying additional cable facilities in the usual manner.

Another object is to minimize the expense of planning, engineering and installing, and of obtaining rights-of-way for, additions to existing underground telephone cable installations.

These and other objectives and advantages of the present invention will become apparent from the description of the cable pipe cable which follows.

In general, the invention comprises a telephone cable pipe cable especially adapted for underground installation having an outer protective sheath in the form of a flexible plastic pipe and a conventional telephone cable inside of, and fixed at its ends relative to, the pipe, the inside diameter of the pipe being sufficiently larger than the outside diameter of the telephone cable to permit the future placement in the pipe of at least one additional cable. In one embodiment of the invention, a pull-in wire is provided inside the pipe when the cable pipe cable is originally installed for use in pulling in an additional cable at some future time when an increase in facilities is required. The cable pipe cable may be manufactured in sections of any suitable length, for example, 5,000 feet in the case of small size cables, the terminal ends of each length of cable pipe cable being provided with butt sleeves containing sealer compound through which extend the capped ends of the telephone cable. The interior of the pipe may be filled with colored air or gas under pressure for indicating the location of a leak or break in the pipe by rising to the top of the ground in which the cable pipe cable is buried and coloring the surface thereof adjacent the point of damage.

Referring now to the drawings, wherein like reference characters indicate like parts throughout the several views:

FIG. 1 is an elevational view, partially in section, of one form of cable pipe cable embodying the invention, showing the cable pipe cable in an underground installation;

FIG. 2 is a vertical cross-sectional view of the cable pipe cable, on an enlarged scale, taken on line 2—2 in FIG. 1;

FIG. 3 is a sectional view similar to FIG. 2 showing a modified form of cable pipe cable;

Figure 4:
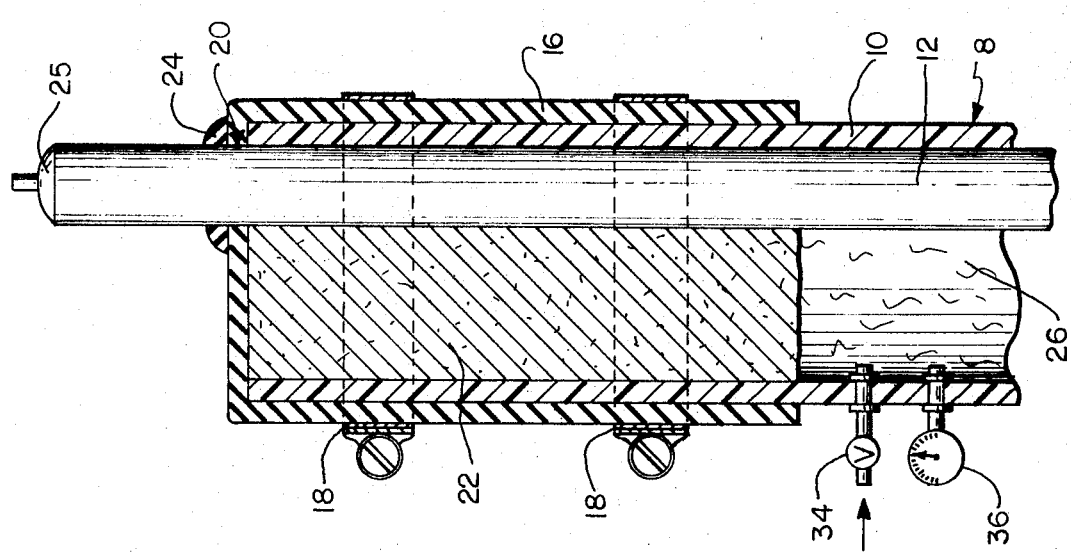
FIG. 4 is an enlarged fragmentary sectional view of one end of the cable pipe cable of FIG. 1.

In the embodiment of the invention depicted in FIGS. 1, 2 and 4, the cable pipe cable 8 comprises an outer protective sheath in the form of a flexible pipe 10 of plastic material suitable for underground installation, inside of which is a conventional telephone cable 12 of any desired number of cable pairs 14. As illustrated in FIG. 2, the inside diameter of the pipe 10 is sufficiently greater than the outside diameter of the telephone cable 12 to permit the subsequent placement in the pipe of at least one additional telephone cable.

As shown best in FIG. 4, each end of the pipe 10 is closed by means of a butt sleeve 16 formed of a rubber type plastic which surrounds the end portion of the pipe wall and is secured thereto by means of screw-type clamps 18. The end of the butt sleeve 16 is provided with an opening 20 through which the telephone cable 12 extends outwardly, and the interior of the end portion of pipe 10 surrounded by the sleeve 16 is filled with a sealer compound 22 which sets hard and effectively fixes the cable 12 to the end of pipe 10. The portion of cable 12 immediately outside opening 20 may be surrounded by a seal 24 formed of a rubber-based sealing compound, and the end of the cable is provided with a cap 25. If desired, a clamp (not shown) may be placed on cable 12 immediately above the seal 24 to prevent any possibility that the sealer compound 22 may not effectively prevent the cable from slipping down within the pipe 10.

Figure 6:
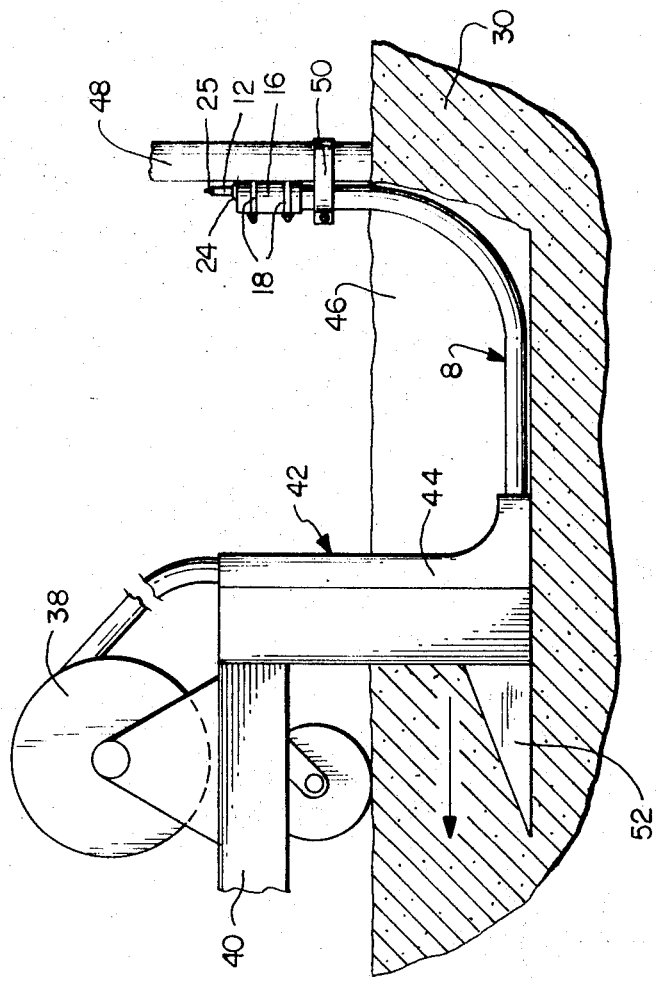
FIG. 6 is a fragmentary diagrammatic view of a damaged underground cable pipe cable indicating how colored gas may escape to and discolor the surface of the ground in which the cable pipe cable is buried so as to indicate the location of a break in the pipe.

In order to facilitate the location of a leak or break in pipe 10 when it is installed underground, the interior of the pipe may be filled with a body 26 of air or gas under pressure incorporating a suitable coloring substance. With this construction, as illustrated in FIG. 6, if a break 28 occurs in the pipe 10, the colored air or gas will escape through the break, pass upwardly through the ground 30 in which the cable pipe cable is buried, and discolor the portion 32 of the surface of the ground above the break. In order to fill the pipe 10 with colored air or gas under pressure, one end of the pipe may be provided with a filling valve 34 and pressure gauge 36, as diagrammatically illustrated in FIG. 4.

Figure 5:
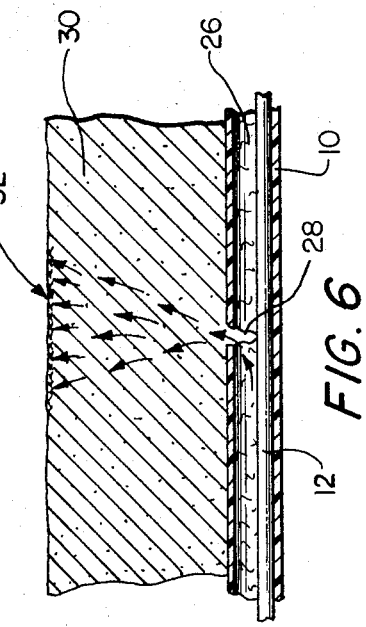
FIG. 5 is a diagrammatic side view of a plow arrangement for the trenchless laying of a cable pipe cable underground.

The cable pipe cable of the present invention may be installed underground in the same manner as a conventional telephone cable, i.e., either by digging a trench in the ground and laying the cable pipe cable in the trench, or by means of a mole or similar plough. As indicated in FIG. 5, a suitable length of cable pipe cable 8 wound on a reel 38 is mounted on the tractor-drawn framework 40 of a conventional type mole or similar plough 42. The end of the cable pipe cable is led downwardly from reel 38 through the L-shaped feeding conduit 44 of the plough, into a trench 46 at the beginning of the cable run, and then upwardly to a pole or other terminal supporting member 48 to which the end of pipe 10 is secured by a suitable clamp 50. Movement of the plough 42 in the direction indicated by the arrow then feeds the cable pipe cable into a tunnel formed by the mole portion 52 of the plough 42. When the plough reaches the other end of the cable run, the reel end of the cable pipe cable is pulled upwardly out of the tunnel and secured to a second pole or terminal supporting member 54, as indicated in FIG. 1. The upwardly extending capped ends of cable 12 are then ready for connection to terminals in the usual manner.

The pipe 10 may be filled with the pressurized air or gas either during the course of manufacture of the cable pipe cable, or after the latter has been installed in the field. If filling is performed by the manufacturer, the gauge 36 will indicate any damage to the cable pipe cable which may occur in shipment.

In an installation of the character illustrated in FIGS. 1, 2 and 4, if the telephone cable 12 requires replacement, either because of a cable failure or because more cable pairs are needed to provide additional service, a new telephone cable may be connected to one end of the existing cable 12 and pulled into the pipe 10 as the old cable is being pulled out. On the other hand, since the interior diameter of pipe 10 is substantially greater than the outside diameter of cable 12, one or more additional telephone cables may be pulled into pipe 10 without disturbing the original installation. In this event, the butt sleeves 16 at both ends of the installation are removed, and a pull-in wire is installed in the pipe 10 by first using a blower to blow a string through the pipe and then using the string to install the pull-in wire, after which the wire is used to pull one or more additional cables into the pipe 10. After the ends of pipe 10 are provided with new butt sleeves 16 and sealer compound 22, the pipe may be refilled with colored air or gas under pressure by means of valve 34.

Alternatively, as shown in FIG. 3, the cable pipe cable 8 may be provided with a built-in pull-in wire 56, the ends of which are brought out through the butt-sleeved ends of the pipe 10 along with the ends of the telephone cable 12, and are fixed to the ends of the pipe in the same manner as the cable.

Although only two specific forms of cable pipe cable have been described and illustrated herein, it is to be expressly understood that these drawings are for the purpose of illustration only, and are not intended to represent the full scope of the invention which is defined in the appended claims.

One of the advantages of the cable pipe cable of the present invention over conventional underground cable installations is the provision of greater versatility of underground telephone service with savings in long term planning for growth in facilities. Since the cable pipe cable can be installed at the same cost, and with the same type of cable plowing or trenching equipment, as conventional telephone cable, and since additional cable pairs can be provided to supplement the original installation by simply placing an additional telephone cable in the cable pipe without disturbing the original installation or requiring another plowing or trenching operation, substantial savings in plant investment can be achieved. The cable pipe cable offers further savings in that the cost of engineering of new cable routes, and the expense involved in securing new right-of-way for additional cable to be placed after the original installation, are avoided. Pulling a new telephone cable through an existing cable pipe is an easy, quick and low cost way of gaining additional cable pairs for new and better service without any substantial amount of added expense.

Another saving in the use of cable pipe cable results from the fact that, in the event of a particular telephone cable going bad or needing replacement by a larger cable, a new cable may be connected to one end of the existing cable and the latter can be pulled out of the pipe as the new or larger cable is being pulled in. This method permits the salvage of the copper or aluminum conductors in the old cable. A further saving in man hours of searching for the location of a leak or break in underground cable results from the use of a colored gas under pressure in the pipe of a cable pipe cable, because the colored gas will rise to the top of the ground in which the cable is buried and discolor the surface thereof to indicate the location of the damage.

Although the cable pipe cable of the present invention can be used as aerial cable by simply lashing it to a supporting steel strand attached to poles in the same manner as a conventional telephone cable, greater advantages and savings result when it is used in underground construction.

I claim:

1. As an article of manufacture, a telephone cable pipe cable for underground installation comprising an outer protective sheath in the form of a flexible plastic pipe of finite length, a conventional telephone cable inside of said pipe, the inside diameter of said pipe being sufficiently greater than the outside diameter of said telephone cable to permit the placement in said pipe after underground installation thereof of at least one additional telephone cable, a pull-in wire inside said pipe, substantially paralleling said telephone cable, for pulling an additional telephone cable into said pipe, means closing and sealing each end of said pipe with the terminal ends of the telephone cable and the ends of the pull-in wire extending outwardly thereof, the end portions of said telephone cable and said pull-in wire being fixed relative to the end portions of said pipe, and a gas under pressure filling the free space within said pipe, the means for closing and sealing each end of said pipe also preventing the escape of said gas from within the pipe.

2. A telephone cable pipe cable as claimed in claim 1 including a valve connected to one end of said pipe for supplying gas under pressure to the interior thereof, and a gauge connected to one end of said pipe for indicating the pressure of the gas within the pipe.

3. A telephone cable pipe cable as claimed in claim 1 wherein the gas within the pipe incorporates a coloring substance which, upon the escape of gas from a buried portion of said pipe, due to a break in the pipe, discolors the surface of the earth adjacent the break.

4. A method of providing an underground installation of telephone cable wherein an additional cable is installed after underground installation of a first cable comprising the steps of manufacturing a finite length of telephone cable pipe cable comprising an outer protective sheath in the form of a flexible plastic pipe, a first conventional telephone cable inside of said pipe, the inside diameter of said pipe being sufficiently greater than the outside diameter of said telephone cable to permit the placement in said pipe of an additional telephone cable, a pull-in wire inside said pipe, substantially paralleling said telephone cable, means closing and sealing each end of said pipe with the terminal ends of the telephone cable and the ends of the pull-in wire extending outwardly thereof, the end portions of said telephone cable and said pull-in wire being fixed relatively to the end portions of said pipe, and a gas under pressure filling the free space within said pipe; burying said telephone cable pipe cable in the ground with the ends of the pipe and the outwardly extending ends of the telephone cable and the pull-in wire positioned above ground; removing the means closing and sealing each end of said pipe, permitting said gas to escape from the free space within said pipe, and attaching one end of an additional cable to one end of the pull-in wire; placing the additional cable in said pipe by pulling on the opposite end of the pull-in wire; reclosing and resealing each end of said pipe with the terminal ends of both telephone cables extending outwardly of the ends of the pipe; and refilling the free space within said pipe with gas under pressure.

* * * * *